July 22, 1952 S. J. BEGUN 2,604,549
DEVICE FOR DUPLICATING MAGNETIC RECORDINGS
BY RE-RECORDING PROCESSES
Filed Jan. 4, 1947 3 Sheets-Sheet 1

INVENTOR
S. J. BEGUN
BY Pinelis & Greene
ATTORNEYS

July 22, 1952 S. J. BEGUN 2,604,549

DEVICE FOR DUPLICATING MAGNETIC RECORDINGS BY RE-RECORDING PROCESSES

Filed Jan. 4, 1947 3 Sheets-Sheet 2

INVENTOR
S.J. BEGUN
BY Pirelles & Greene
ATTORNEYS

July 22, 1952 S. J. BEGUN 2,604,549

DEVICE FOR DUPLICATING MAGNETIC RECORDINGS BY RE-RECORDING PROCESSES

Filed Jan. 4, 1947 3 Sheets-Sheet 3

INVENTOR
S. J. BEGUN
BY Pincles & Greene
ATTORNEYS

Patented July 22, 1952 | 2,604,549

UNITED STATES PATENT OFFICE 2,604,549

DEVICE FOR DUPLICATING MAGNETIC RECORDINGS BY RE-RECORDING PROCESSES

Semi Joseph Begun, Cleveland Heights, Ohio, assignor to The Brush Development Company, Cleveland, Ohio, a corporation of Ohio Application January 4, 1947, Serial No. 720,245

9 Claims. (Cl. 179—100.2)

This invention relates to commercial recording systems for preparing large quantities of high quality magnetic recordings on magnetic record tracks.

Among the objects of this invention is an efficient recording apparatus and method making possible the rapid production of many simultaneous copies of magnetic records, at the same time assuring high and uniform fidelity.

The foregoing and other objects of the invention will be best understood from the following description of exemplifications thereof, reference being had to the accompanying drawings, wherein—

Figures 1, 2, 3, 4, 5:
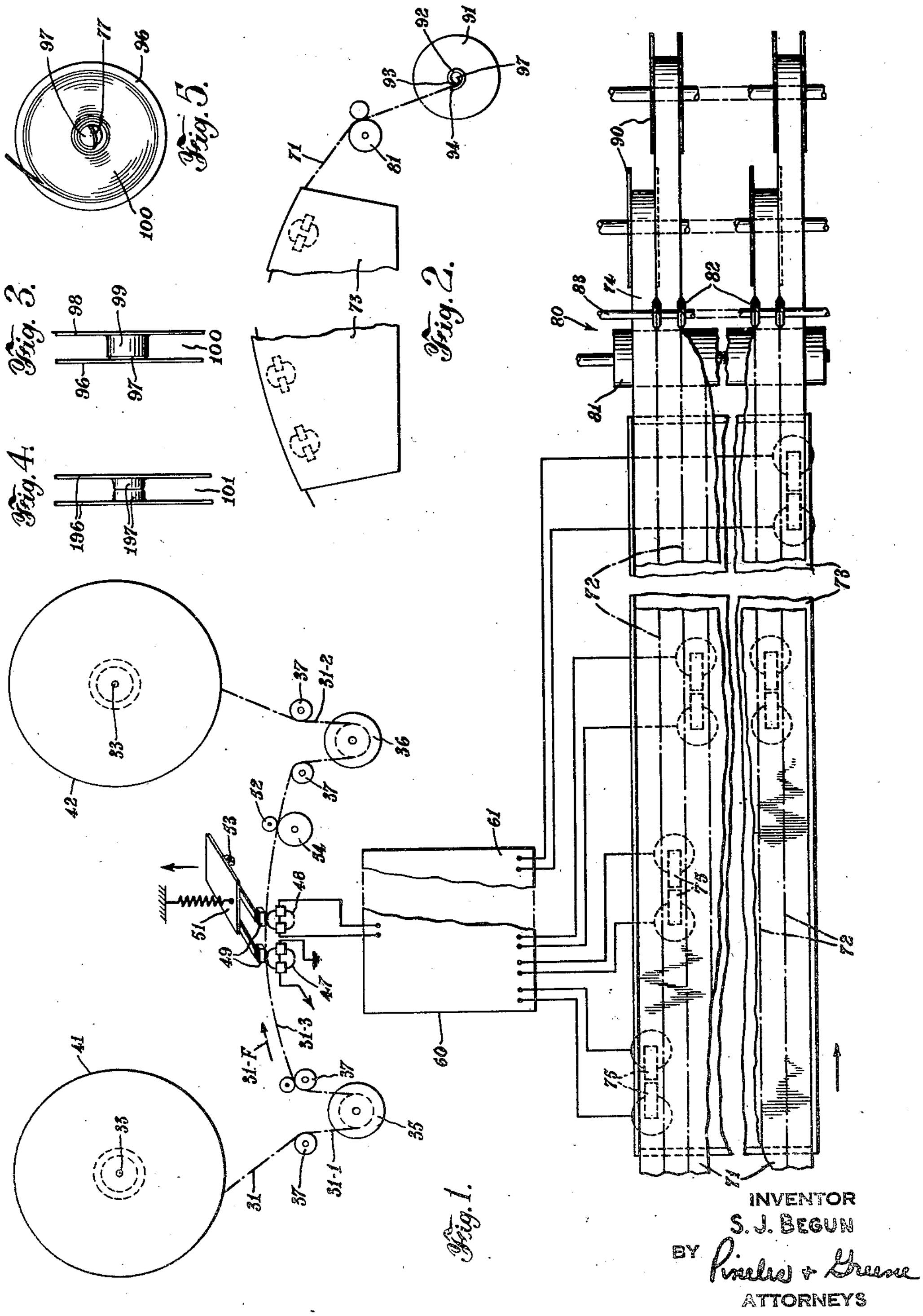
Fig. 1 is a diagrammatic representation of a magnetic record duplicating apparatus according to the invention.
Fig. 2 is a side view of a modified magnetic reproducing apparatus for continuously making copies according to the invention.
Figs. 3 and 4 are sectional views of different forms of reels for holding individual wound recordings.
Fig. 5 illustrates one method of mounting the individual wound recordings on a reel such as is shown in Figs. 3 or 4.

Heretofore there has not been known any practical method or apparatus for making copies of a magnetic recording at a cost permitting their wide distribution and use. The conventional phonograph recordings have the disadvantages of only permitting a few minutes recording on one record disc and are relatively expensive per unit of recording time since the phonograph discs are stamped and one stamping with one stamping disc can produce only one record.

According to the invention a great many magnetic recordings can be inexpensively made by mass production techniques with a relatively small investment in reproducing apparatus. The individual copies so made may have recording times as long as one hour or even longer, and a single master recording may be employed for simultaneously making a great many copies in a single operation.

The popular use of home or amateur type of magnetic recording and reproducing apparatus depends in part upon the inexpensive commercial availability of high quality magnetic recordings of popular masterpieces, such as musical works, operas, plays, etc. In accordance with the principles of this invention such recordings may be made by mass production methods using automatic apparatus if desired.

The commercially available recordings must have a minimum of distortion, as wide a frequency response as possible, and a maximum signal-to-noise ratio. In accordance with this invention these recordings are prepared by first making an original or master recording on apparatus designed to substantially exceed the specifications for the commercially available copies which may be recorded on the limp magnetic record track having a bonded stratum containing substantially uniformly dispersed therethrough permanently magnetizable particles, such as the tapes described in the Kornei applications, Serial Nos. 685,092, 685,093, filed July 20, 1946, the latter application having been abandoned. Such record tracks even with a paper base one-quarter inch wide are inexpensive and are suitable for recording and playing back signals with a very high signal-to-noise ratio. The master recording, however, may be recorded on a record track having a plastic base and of greater width so as to improve the quality, smoothness and signal output level to give the desired higher signal-to-noise ratio. Furthermore, the plastic tape is less liable to dimensional change in response to ambient humidity and temperature changes consequently minimizing distortion of the recording. The master recording may also be prepared with a higher tape speed than is intended for the playback of the copies inasmuch as the high frequency response is considerably improved by increasing the magnetic wave length on the tape. Whenever the magnetic wave length on the tape approaches the dimension of the non-magnetic gap with which it is magnetically linked to a transducing head, slight and unavoidable gap variations cause very wide output variations at the higher frequencies. The recording head used for making the master recording should be carefully shielded and be kept free of any D. C. field or permanent magnetization, such as might be produced by a mechanically strained condition of the highly permeable magnetic material that establishes the magnetic core in the head.

After the master recording is made it may be reproduced on special reproducing equipment in accordance with the invention which is equipped with playback heads only so as to eliminate any D. C. field or other marring conditions.

For high efficiency a pair of sub-master records is made so that one sub-master may be copied while the other is being rewound for copying. The sub-master should fulfill all the requirements set forth above for the master recordings. Alternatively, a pair of original masters may be made. Home type recorder-reproducers are conventionally equipped for using magnetic record tracks wound in coiled form on reels and arranged to unreel the track from a supply reel and reel up on a take-up reel the track unreeling from a supply reel after it has passed in contact with a transducing head. The track thus reeled upon the take-up reel is now reversed in sequence with respect to the original winding and must be rewound for further transducing, and home recorders are also equipped for such rewinding of the tape from the take-up reel back to a supply reel so as to properly redispose the tape in the correct sequence. According to the invention the copies of the sub-master pair may be made with the sub-masters running in the reverse sequence so that the copies may be directly reeled up in the correct sequence and sold without further reeling.

The commercial recordings may be distributed as large reels containing continuous multiplicity of individual recordings so that the individual numbers may be retailed by winding a suitable length onto a small dispensing reel. Since such dispensing reverses the sequence, the continuous multiple recording may be distributed in the playback sequence.

Fig. 1 illustrates diagrammatically an apparatus for copying magnetic records in accordance with the invention. A master recording 31 is shown as unreeling from a supply reel 41 moving across a record track guide path in contact with two magnetic cores 47, 48 and a capstan roller 52 to be wound on a take-up reel 42. The capstan roller may have a high rotational inertia and is driven by a constant speed motor so that the tape pressed against the frictionally engaging this capstan roller will be driven at a constant speed in a path which causes the tape to be mechanically linked with the two cores 47, 48. The magnetic core 47 may be used for erasing and preparing the record track for receiving a recording, and the magnetic core 48 may be used for supplying the magnetic signals to be recorded on the master record track. As shown, the apparatus is arranged for the copying of the master recording, the windings of the erasing core 47 being disconnected and the windings of core 48 being connected to the input of an amplifier 60. A magnetic copy track 71 which may be in the form of a tape of substantial width, as shown, is also illustrated as moving across a magnetic copying assembly 73 containing a multiplicity of magnetic cores 75 which may be positioned along separate channels of the tape, staggered along the width of the copy track, in the manner illustrated, and used for recording a copy of the master. Each of the copy recording cores 75 is shown as connected to an output 61 of the amplifier 60 which also contains means, such as an oscillator, (not shown) for providing the biasing currents necessary for super-imposing on the signals to be recorded at the highest fidelity as is well known.

Copy track 71 after passing over the assembly 73 is illustrated as cut into the various individual channel widths by a cutter assembly 80 including a roller shaft 83 provided with cutting blades 82 and a backing roller 81. The individual copies are then reeled on individual reels 90 which may likewise be staggered for ease in winding and manipulation.

The master playback assembly is shown as provided with pads 49 mounted on a pressing arm 51 pivoted at 53 and urged as in the direction of the affixed arrow so as to press the record track 31 against the cores to insure constant and effective magnetic contact between the master record track and the magnetic cores even though the tensile reeling forces are small. The capstant roller 52 is rotated at a constant speed by means, such as a motor (not shown), for the purpose of impelling the record track at a constant speed past and in magnetic linkage with the magnetic cores. A backing roller, such as the roller 54, may be provided to improve the contact between the capstan roller and the record track. The constancy of movement of the master record track 31 may also be improved by providing loops 31—1 and 31—2 in the record track guide path on either side of the constant speed zone 31—3. The loops 31—1 and 31—2 greatly lower the tensile forces appearing in the master record track along the portion 31—3 and substantially completely divorce this portion of the record track from the portions immedately adjacent the supply and take-up reels 41, 42. These reels may be independently driven by motors connected to shafts 33 upon which they are shown as pivotally mounted. Loops 31—1 and 31—2 are shown as maintained by means of floating rollers 35, 36 which are suspended on the loops and fixed rollers 37. The reels may be rotated by their motors so as to feed record track from the reel 41 to maintain the loop 31—1 and to take-up the record track from the loop 31—2 without eliminating this loop, when the record track is impelled in the forward or transducing direction indicated by the arrow 31-F.

The magnetic copy track 71 may also be moved at constant speed by a capstan roller which may be the backing roller 81 of the cutting assembly 80. For proper adjustment of the cutter blades transversely of the record track 71, guide lines indicated by the dot-dash lines 72 may be provided on the record track to mark the boundaries between the individual traces of copy track. With the arrangement shown it is very simple to quickly and accurately observe whether or not the cutting is effected on the guide lines and to promptly make any necessary adjustments. The guide lines 72 may be arranged to be made during the copying as by an inking device mounted upon the copying assembly 73 so that the marks 72 are accurately inked at those portions which separate the record track made by one copying core 75 from the record track made by the adjacent copying cores.

The copy track 71 may be impelled onto the assembly 73 from a source (not shown) at which it is prepared in magnetically neutral condition so as to properly receive the recording. Alternatively, a demagnetizing unit, such as one or more cores, may be positioned in the copy track path before the copying assembly to demagnetize the entire width of copy track. Additionally, the assembly 73 may have an erasing core mounted in each copy channel either as a group of cores or as individual cores paired with and adjacent to the recording core 75 of each channel. The magnetic linkage of the track channels with the cores of the assembly may be improved under the low tension reeling by supplying pressing pads, such as by placing a cover member containing projecting pads over the assembly 73 containing the tape 71. The cover may be hingedly affixed to the assembly 73 along one edge. Such a pressing unit is indicated in Fig. 2.

As indicated, the apparatus of Fig. 1 may be operated by first recording the master recording on the track 31 with the magnetic core 48 connected to the output of a suitable original recording amplifier and with the core 47 fed by a suitable source of erasing current. The record track 31 now containing the master recording may then be rewound and transduced into the copying amplifier 60 by connecting the windings of the core 48, as illustrated, and leaving the windings of core 47 unconnected. A number of copies may accordingly be made simultaneously and wound on the reels 90. After the completion of the first set of copies the record track 31 may then be rewound while another master recording, prepared in the meantime, may be connected to the input of amplifier 60 to continue the copying without stopping the record track 71. If desired, a single master recording may be used and the track 71 stopped during rewinding. Each reel 90 may be large enough to accommodate a number of individual copies on a single width and this number of copies may be wound upon the same continuous individual width 74. After the reels are filled the record tracks 74 may be severed and connected to another set of reels for continued copying.

Where the recording to be copied is of short duration it may be adequately transduced on an endless type of record track on a recorder of the type described in the copending Miller application, Serial No. 588,911, filed April 18, 1945, now Patent No. 2,426,838. With such an arrangement copies may be made continuously and repeatedly, stopping only for the mounting of new reels 90. The endless type of recordings, however, are not suited for the longer records, such as those that are transduced over a period as long as thirty minutes or longer, and an arrangement such as that illustrated must be used.

Attention is called to the fact that the drawings are not working drawings indicating actual construction details, but are merely in the nature of explanatory drawings which may have parts distorted or omitted for greater clarity in illustration.

In place of the reeling arrangement 90 of Fig. 1 in which the tape 71 is slit before reeling, the copied track may be wound without slitting on a master reel and slit afterward.

Fig. 2 illustrates diagrammatically such a construction in which the record track 71 is impelled by the capstan roller 81 and wound on a reel 91 having a record track receiving space wide enough to admit the entire width of the copy track 71. After the reel 91 is filled, the track 71 may be severed and the entire reel contents be slit into individual widths. For such slitting the reel 91 may be made disassembled and the reel mandrel 92 may be made removable as by making it in a form of a curved sheet of collapsible spring material, as illustrated. The ends 93, 94 of the mandrel spring may be arranged to receive and hold the anchoring end of the record track 71. A loose tail 77 of the anchored record track may be provided for the purpose indicated below.

After the reel portions have been removed from the wound-up recording it may be sliced as by a conventional saw means into the individual widths without rewinding. The individual wound widths may then be mounted on individual reels, such as by assembling the individual reels around the windings. The individual reels may be formed of two circular wall portions joined together at their central regions, as indicated by the sectional views of the reels 100 and 101 in Figs. 3 and 4. One of the reel members indicated at 96 in reel 10 having an upstanding central boss 97 may have the individual winding 100 mounted on it in such a manner that the tail piece 77 of the recording overlies the boss 97, as shown in Fig. 5. The mating reel member 98 having a central collar 99 frictionally fitting over the boss 96 may then be placed over the winding 100 so that the collar 99 engages the boss 97 and the reel is thereby held together. The tail piece 97 of the record tape serves to anchor it between the reel members.

With a reel structure such as is shown in Fig. 4 the assembly may be similarly effected, the reel portions being suitably held around the winding as by spot welding or bolting together the hub portions 197 of the reel halves 196. The provision of a plurality of spot weld locations will adequately prevent the interference of a tail 77 with proper assembly. The tail does not interfere with a bolting operation.

The reel mandrel may, if desired, be made expendable as by making it in the form of a wood shaft which need not be withdrawn from the wide tape winding, but may be cut together with the tape into individual widths. If the shaft is made hollow, the hollow individual shaft widths may be assembled with the individual reels in the manner indicated in Fig. 5. The individual shaft widths may, however, be removed and discarded or may be used as the hub of an individual reel by merely securing reel flanges to it. When using mandrels not equipped with tape gripping structure, the end of tape 71 may be anchored by adhesive or adhesive tape which may extend the width of the tape 71 and be retained after cutting for holding the individual cut widths of wound tape properly anchored to the individual shaft section forming part of the individual width reels.

Such permanent tape mounting in the reels is especially suited for those home type recorders in which the unreeling from a supply reel is automatically stopped before the tape is completely unreeled, as more fully described and claimed in the copending Dank application, Serial No. 690,878, filed August 16, 1946, issued as Patent No. 2,535,486 on December 26, 1950.

The wide tape 60 may be fastened to the reel 61 by means of a preliminary leader strip to which it may be cemented so that the completed narrow reel has a leader strip attached to its inner end and arranged to have a predetermined physical characteristic for operation of the unreeling limit stop in the home recorder-reproducer.

Where the home recorder-reproducer is equipped with sensing means for preventing inadvertent erasure or superimposed recording on a commercial recording, as described and claimed in the copending Begun application, Serial No. 713,963, filed December 4, 1946, issued as Patent No. 2,538,892 on January 23, 1951, the recording system of Figs. 3 and 4 should be suitably arranged to provide the desired physical characteristic. As indicated in the above-mentioned Dank application other physical characteristics and arrangements may be employed to effect the reversal of reelings in the reproducer described above in connection with Figs. 1 and 2.

With the limp tapes referred to above the magnetic linkage with the magnetic heads may not have sufficient constancy without the use of additional soft resilient means for pressing the tape against the magnetic head. Such additional pressing means are also described and claimed in the above-mentioned Dank application. Metal tapes may also be advantageously used as a master or submaster recording medium.

For the high fidelity of the commercial recorder it is advisable to incorporate means for assuring the constant speed reeling of the tape.

Figs. 6 through 9 diagrammatically illustrate in greater detail a continuous transducer having a constant speed reeling mechanism of the type shown in Fig. 1. A tape 31 is unwound from supply reel 110, moved along the playback guide path indicated by the loops 31—1, 31—2 and the dash-double-dot line 142 in contact with the transducer unit 148 and capstan roller 152 to be wound on the take-up reel 112. Behind this reeling assembly, and as more clearly shown in Figs. 8 and 9, a second record track 32 is guided from a second supply reel 111 over a similar guide path 143 and wound on a second take-up reel 113. A constant speed rotation is applied to capstan roller 152 and separate independent driving means 114, 115 are connected to the reels to impel them independently of each other and the capstan roller 152. Loops of tape 31—1, 31—2 are permitted to accumulate between the reels and the capstan impelled constant speed intermediate portion of the guide path.

A second capstan roller 153 and a second transducing unit 149 are provided over the rear guide path 143. A pair of shift arms 160 and 161 are shown as mounted on a common shaft 163 and equipped with pressing rollers 170 and 171 arranged for holding the record tracks 31 and 32, respectively, against the capstan rollers in their respective paths. The shift arms are shown as pivotally mounted so that when one arm 160 has its roller in the capstan engaging position, the other arm has its roller disengaged from the associated capstan and held out of the way. The shift arms may be suitably operated as by the control links 180 so that either record track may be held against its corresponding capstan roller as desired.

The construction also shows a pair of pressing pads 49 mounted on pad levers 182 and 183 so that each may be brought into engagement with one of the record tracks 31, 32 to hold it against the corresponding transducing unit 149 for stable magnetic linkage and uniform transducing without subjecting the record track to an unnecessarily large amount of tension. The pad levers 182, 183 are illustrated as biased away from pressing engagement with the transducing unit by the springs 190 and are urged into pressing position by pins 191 and 192 mounted on the arms 160 and 161 which in downward position cause the pins to engage an arm 185 of the respective pad levers and to press this arm with its pad 49 against the transducing unit. The arms 195 of the pad levers may be flexible and of a spring-like nature so as to enable the construction and positioning of pad levers in a manner permitting generous tolerances.

Rollers 171 may likewise be resiliently and yieldably mounted on the shift arms as, for example, by holding the ends of the rollers in bearings that float in bearing supports as by being held only by springs in slots in the bearing supports, each floating roller end being biased inwardly away from at least one end of a slot.

Figure 6:
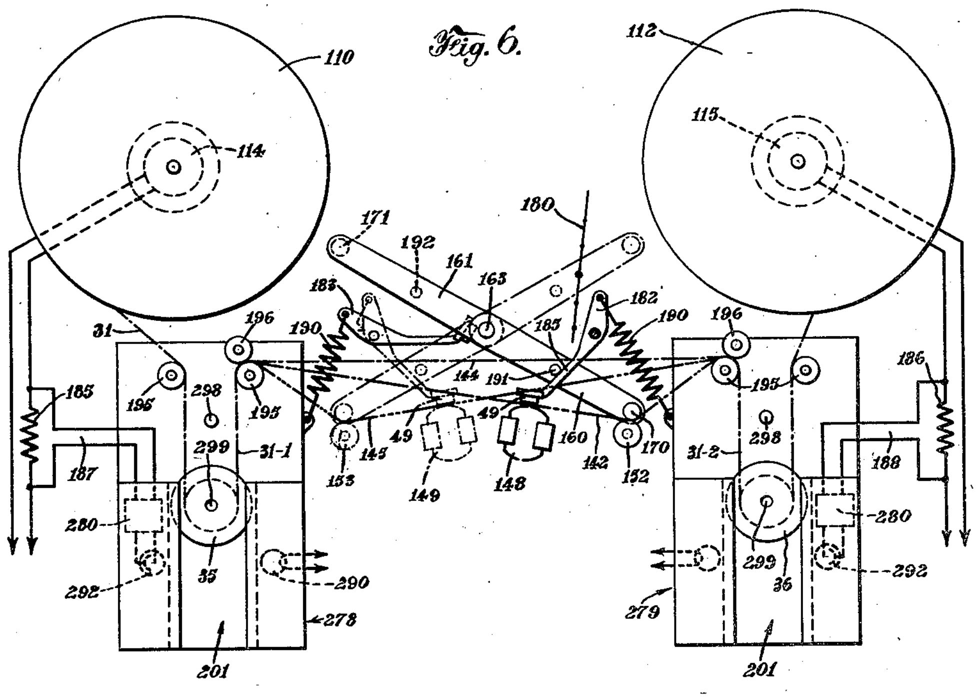
Fig. 6 is an elevational view of a master reeling apparatus such as is shown diagrammatically in Fig. 1.
Figure 7:
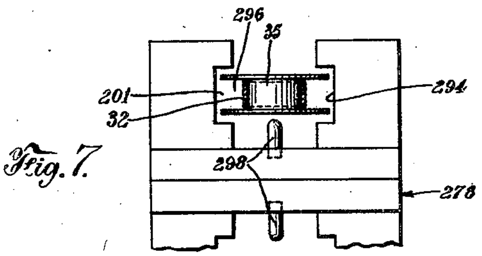
Fig. 7 is a bottom view of one of the speed control units of Fig. 6.

With such an arrangement when the shift arms are placed in the full line position in Fig. 6 the rear record track 32 will move along a guide path indicated by the substantially straight dash-dot line 144 while the forward record track 31 will be directed by the pressing roller 170 into the guide path 142 in which it is also held by the pad on pad lever 182 into stable magnetic engagement with the transducing unit 148. When the shift arms are pivoted to the dash-dot position shown in Fig. 6 the lifting of the pressing roller 170 will permit the forward record track 31 to return to a straight guide path, as indicated at 144, while the rear record track 32 will be engaged by the pressing roller 171 and moved into the deflected guide path indicated by the dash-triple dot line 145 in which it is frictionally held against the capstan roller 153 and stably held between transducing unit 149 and pad of the pad lever 183.

Figure 8:
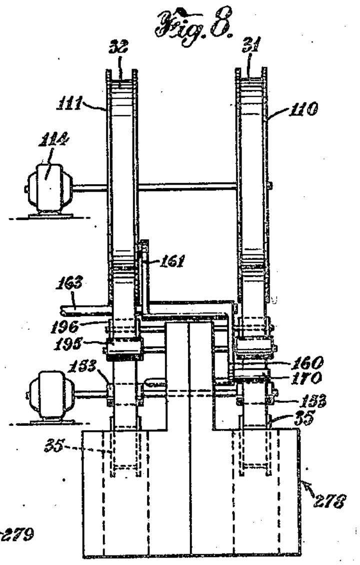
Figs. 8 and 9 are side and top views of the reproducing apparatus of Fig. 2.
Figure 9:
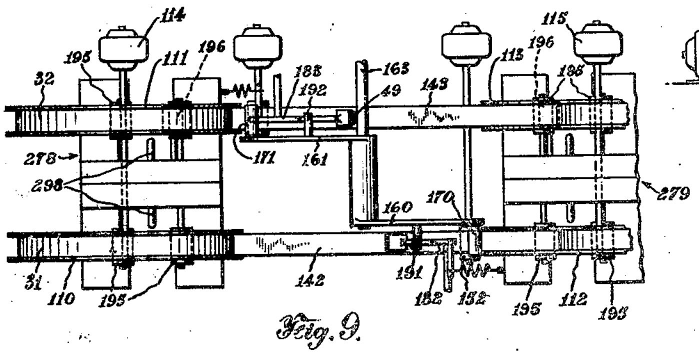

The above record track guide path shifting applies to that portion of the guide path between the two loops 31—1, 31—2 shown in Fig. 6. These loops are shown as maintained between idler rollers 195 mounted on reel speed control assemblies 278 and 279. The loops 31—1 and 31—2 may hang freely or may be slightly weighted by the floating rollers 35, 36 to hang in a channel 201 of each speed control unit. The very light tension thereby applied to the loops permits isolation of substantially all impelling forces applied to the tape by the reels from the constant speed impelling forces applied by the capstan 152. A similar pair of loops may be provided for the rear tape 32, as indicated in Fig. 8, in which the reel pairs 110, 111 and 112, 113 are each mounted on and driven by a common shaft. The loops are maintained by driving the reel impelling motors 114, 115 in such a manner that with no resistance in series in the electrical circuit supplying the motors, the reels will turn at a speed higher than required to reel the tape at the constant speed of the capstan impelled portion. This higher speed will cause the tape to unreel from the supply reel 110 in such a manner as to lengthen the loop 31—1 and to reel on the take-up reel 111 at a speed tending to shorten the loop 31—2. Resistors 185, 186 are placed, respectively, in the electric supply line feeding the motors 114, 115, the resistors being of a value high enough to cause the motors 114, 115 to impel the reels more slowly than is required by the constant speed of the capstan impelled portion of the tape. Circuits 187, 188 are connected to relay operated switch mechanisms 280 so as to automatically by-pass the resistors 185, 186, respectively, under the control of the speed control units 278 and 279.

Each speed control unit is shown as provided with a light source 290 and a photoelectric cell 292 placed on opposite sides of the channel 201 and communicating with each other by transparent passageways. A combined relay and switch mechanism 280, which may be a conventional vacuum tube circuit, is shown as operated by the photoelectric cell 292 to open and close the by-passing circuits 187, 188. The by-passing circuit 187 is connected so as to be opened by the obstruction of light from the corresponding photocell, and the by-passing circuit 188 is connected so as to be closed by the obstruction of light from its corresponding photocell.

Both side walls of each channel 201 are grooved as indicated at 294 to loosely surround the floating roller 35, 36, which roller is also grooved peripherally at 296 to accommodate the record track. Pins 298 may be provided to frictionally engage a central aperture 299 in the floating rollers 35, 36 and hold the rollers when they are not being used.

The apparatus of Figs. 6 through 9 may be started by passing a loop of record track around the rollers 35, 36 and lowering the rollers into the channels 294. In operation, the apparatus will maintain the loops 31—1 and 31—2. Considering the loop 31—1, the resistor 185 is by-passed when, as shown, the loop does not obstruct the passage of light from the light source to the photocell of the control structure 278, and the motor 114 will impel the tape at a speed high enough to lengthen the loop and permit it to move downwardly. When the loop lengthens to an extent sufficient to cut off the illumination of photocell 292, the by-passing circuit 187 opens and the motor speed 114 decreases and the loop begins to shorten until photocell 292 is again illuminated and the motor 114 increases in speed again. Repeated alternate decreases and increases of motor speed maintains the loop. Similar operation maintains loop 31—2 and the entire reeling takes place with the transmittal of substantially no force from the reels to the constant speed capstan impelled intermediate portions 142 or 145, and there is no perceptible change in the constancy of the capstan impelled speed.

With heavy tape, such as the conventional metallic tape, the loop maintaining rollers may be omitted since the weight of the tape in the loops is sufficient to maintain them.

Other controlling means may be used to operate the circuits 187, 188, as for example, by suitably mounting the rollers 35, 36 on pivoted arms linked to switches or relays operated by the pivoting of the arms to open and close the circuits 187, 188, as desired.

Such mechanical switching operates without too frequent switch actuation. In the event, however, that the speeds of the motors 114, 115 are too far removed from the speed necessary to feed and take up the tape at the constant speed of the capstan-impelled portion, and operation of the switches in circuits 187, 188 become objectionably frequent, the mechanical switch linkage may be modified so as to be operated only after a lag to inject a minimum time delay between the switch actuating operations. The lag may be provided by a time delay mechanism, such as a dash pot, or by arranging the switch height providing a region in which the switches are not operated.

Two photoelectric cells and two light sources may be similarly provided for each loop in the construction of Fig. 5 to provide two levels of operation. When the reels 110 through 114 accommodate so much record track that with a minimum record track content the reeling diameter is much smaller and the reel speed in R. P. M. must be much higher than with a maximum record track content, variable resistances may be substituted for the resistors 185 and 186 and may be controlled as by a potentiometer arm operated by a reversible motor actuated by the relays 280. Alternatively, the by-passing circuits 187 and 188 may be electronically established so as not to require any moving switch parts.

Backing rollers 196 may be used with the idle rollers 195, as shown, to assist in the impelling and guiding of the tape.

Since the two sets of reels are driven by the same set of motors, only one pair of speed control assemblies are needed to control one record track, the other record track being carried along. The different record tracks need not be carried at the identical levels in their corresponding loops so long as neither level is too low or too high to cause interference. In general, the diversion of one record track by one of the rollers 170, 171 will change the comparative loop levels.

The above apparatus although described for use with master record tracks in the form of tape is also useful for making commercial records from master record tracks in the form of filaments or wires. The magnetic master record track composition may be either the conventional magnetizable metal, or bonded permanently magnetizable particle-containing strata described in the above identified Kornei applications.

The master or sub-master recordings may be originally mounted on the left-hand reels 110, 111, the front recording on reel 110 being in reverse sequence and the rear recording in direct sequence. With the shift arms in the position shown by the full lines in Fig. 6, the front recording will be reproduced in the front transducing unit 148 in reverse sequence and wound up on right-hand reel 112 into direct sequence while the rear tape is rewound without reproduction on the rear reel 113 into reverse sequence. Both recordings are started together and since they have the same length will end together, the right-hand reels winding up both tapes at the same speed. After this playback is completed the shift arms 160 and 161 are rotated to the opposite position shown by the dotted lines in Fig. 6, and the movement of the tapes are reversed so that they unreel from the right-hand reels 112, 113 and reel up on the left-hand reels 110 and 111, only the rear tape playing back. After this second reeling is completed the shift arms are again reversed and reeling started in the right-hand direction again. The copying can thus be effected continuously and practically without pause.

Suitable signalling means may be used to indicate the termination of a recording so that the reeling may be reversed before the tape is completely removed and detached from the reel from which it is being unwound, thereby making it unnecessary to continually attach the end of the tape for beginning a winding operation. The master or sub-master recordings should have leader strips affixed to both ends of the tape, and these leader strips may be used as part of the signal means. One example of such use in accordance with the invention is to provide the leader strips with an electrically conductive surface coating and to provide means responsive to the surface conductivity of the record track in the guide path so as to automatically reverse the reeling direction and shift arms upon the arrival of the electrically conductive coated portion at the responsive element. One of the two left-hand rollers 320 may, for example, be made of two metallic portions separated by a dielectric and provided with brushes interposed in a relay system so arranged that actuation of the relay will rotate shaft 163, disconnect one of the playback heads, connect the other playback head, disconnect the drive in one direction and actuate the drive in the reverse direction. The shift arm actuation may be manual, or if desired it may be automatically operated, as by a limit switch arrangement responsive to the unreeling of the desired amount of record track from either reel. Suitable automatic limit switches may be of the type which stop a reeling operation before all the record track is unreeled so that it is not necessary to anchor one end of the record track for either reeling. Such limit switches are disclosed in the above-mentioned Dank and Begun applications, as well as in the application of Begun, Serial No. 537,288, filed May 23, 1944, now Patent No. 2,513,616 which are hereby made a part of this disclosure.

Where only one master recording is made and a pair of copying masters or sub-masters is to be prepared, time may be saved by immediately copying the one master on the apparatus of Fig. 1, for example, no intervening rewinding being necessary and simultaneously feeding the output to be copied to a special master recording apparatus. By this procedure a second master may be prepared while the first master is being copied, and the second master will be ready for copying in reverse sequence just as soon as the first copying run from the first master is completed. The second master may then be mounted on the proper reel of the apparatus of Fig. 1 and copied while the first is being rewound. Continued copying may then proceed as indicated above. With the arrangement shown in Figs. 6 through 9 the second master may be made on one record track while the first master is being transduced on the other record track, an erasing core being provided in the second guide path as shown in Fig. 1.

Alternatively the construction of Figs. 6–9 may be arranged with means permitting independent reeling of only one of the record tracks as well as the reeling of one record track from a left-hand reel to a right-hand reel while the other record track is reeled from a right-hand reel to a left-hand reel. As so modified the original recording may be simultaneously made on both reels while they are reeled in opposite directions to provide two master recordings in opposite sequence after only a single reeling operation.

The master recording in the desired sequence may then be rewound by itself and copied, after which the simultaneous drive of both master recordings may then be established in the same direction and the repeated copying effected without appreciable pause.

The necessary drive connections for the above operations may be provided by suitable disengaging means such as slidable splined collars in the portion of each shaft connecting the coaxial reels, together with means for reeling each coaxial reel in a different direction as for example a cross-drive connection from the left and/or right hand rear reel 111, 113 to the right and/or left hand forward reel 112, 110 respectively, or by a separate set of reel drive motors connected to drive the forward reels 110, 112.

In the modification described above the control levers 160, 161 should also be separable for the simultaneous pressing of both record tracks against its magnetic core and capstan roller.

If the master copy track is not carefully demagnetized previously erasing cores should be provided along each record track guide path 142 and 145, as well as additional pressing pads for the erasing cores if desired.

The different amplifier outputs 61 of amplifier 60 should be independent so that no one output affects any of the others and in the event that something amiss occurs it is confined to the minimum number of outputs. The independency of outputs may be obtained, for example, by using a separate final output amplifying stage for each of the individual magnetic heads, and operating all the separate final outputs from one or more preliminary amplifiers. Spare preliminary amplifiers together with a switching arrangement may be mounted so that in the event of the failure of one preliminary amplifier another may easily be substituted.

Figure 10:
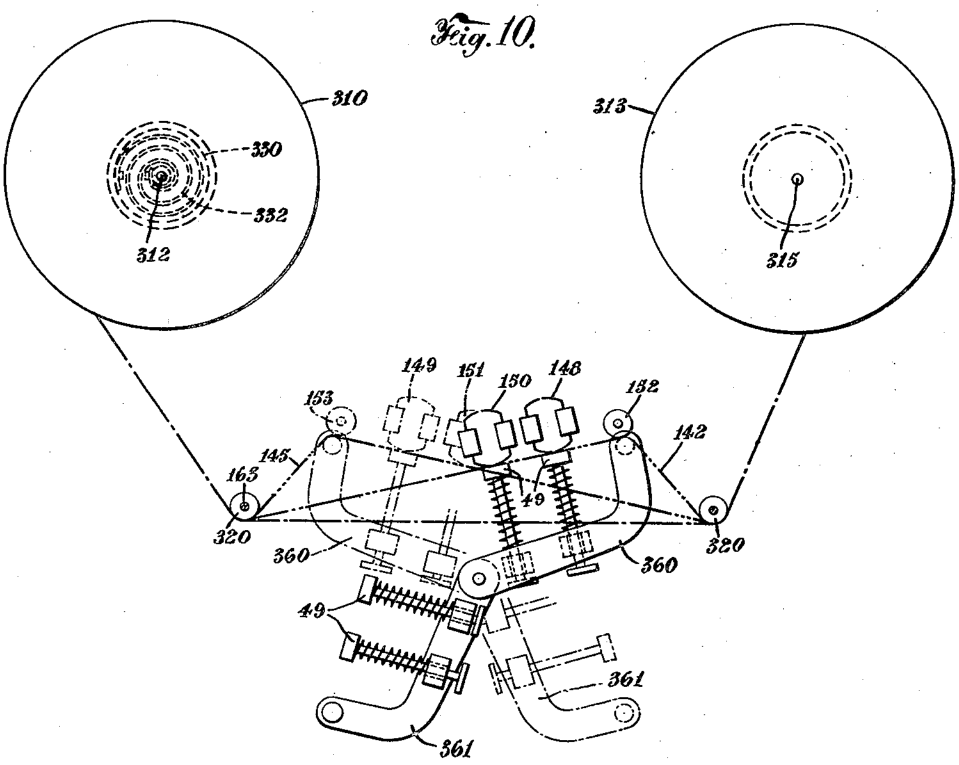
Figs. 10 and 11 are top and side views of a master reeling and reproducing apparatus according to another form of the invention.
Figure 11:
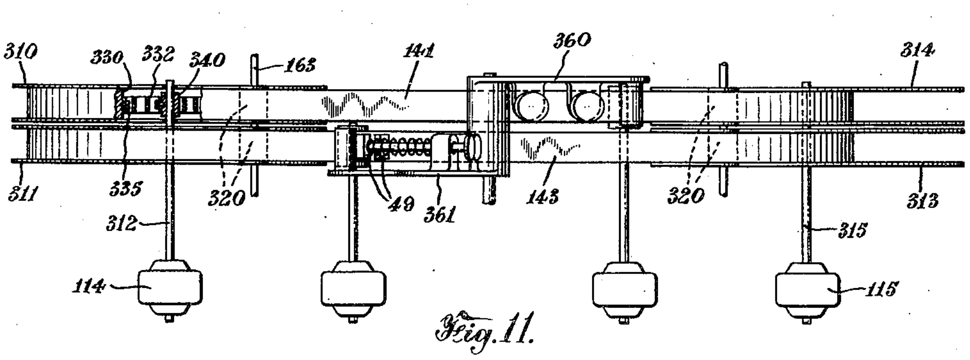

Figs. 10 and 11 illustrate another form of submaster playback apparatus having a pair of left-hand reels 310, 311 mounted one above the other on a common shaft 312 suitably drivable by motor 114. A similar set of right-hand reels 313, 314 are also mounted on a common shaft 315 drivable by right-hand motor 115. A pair of rewind record track guide paths 141, 143 is established between the two reel pairs by means of guide rollers 320 in a manner similar to that shown in Fig. 6.

The construction Figs. 10 and 11 includes two pairs of magnetic heads 148, 150 and 149, 151 as well as shift arms 360, 361 generally similar to the arms of Figs. 6 through 9, differing in that the pressing pads 49 are shown as loosely mounted on the shift arms and biased outwardly to press a record track against the magnetic heads when the corresponding shift arm moves the track into the capstan engaging position shown by one of the lines 142, 145.

One or more of the reels, such as the reel 310, may be provided with a record track receiving floor 330 spaced from the reel axis by a distance sufficient to house a coil spring which has one end suitably secured as by screw 335 to the floor 330, and the other end secured to a collar 340 held fixed on the shaft 312.

The walls of the reel housing the spring 312 are spaced from the axis, as shown, to permit limited relative rotation of the reel with respect to its shaft. With such construction the two record tracks may be simultaneously reeled on the same shafts, the difference in record track length between the reels resulting from the deflection by the rollers on the shift arms being taken up by self-adjustment of the tension of the spring 332. For greater ease of assembly and initial spring adjustment, one of the end plates of the reel 310 may be made detachable.

As another modification of master or submaster playback unit, a substantially non-varying record track guide path may be used both for transducing and rewinding as, for example, by placing the magnetic core faces and the capstan roller alongside the guide path of each record track. The core faces may be burnished to reduce friction during rewinding and pressing pads may be provided in a manner similar to those shown in Figs. 6 and 10 to press the record track into stable engagement with the cores during a transducing operation. The capstan roller may be similarly burnished and a pressing roller provided for holding the record track in frictional engagement with it without appreciably changing the record track guide path.

It will be apparent to those skilled in the art that the novel principles of the invention disclosed herein in connection with specific exemplifications thereof will suggest various other modifications and applications of the same. It is accordingly desired that in construing the breadth of the appended claims they shall not be limited to the specific exemplifications of the invention described above.

I claim:

1. A recording apparatus for making copies of lengthy magnetic recordings on elongated magnetic record tracks comprising, in combination: a first and a second master record member each having the same complete recording thereon which is to be dubbed onto other record tracks, means for simultaneously driving both said master record members selectively forward and backward including means for driving backward each of said master record members while the other is being driven forward, reproducing head means in flux linkage relationship with both of said master record members for reproducing the recording from the first master record member while it is going in a direction such that the first reproduced recording is in reverse sequence and from the second master record member while it is going in a direction such that the second reproduced recording is in reverse sequence, a first magnetic record track onto which said first reproduced recording is to be dubbed, and a second magnetic record track onto which the said second reproduced recording is to be dubbed, recording head means electrically connected to said reproducing head means and in flux linkage relationship with said first and second record tracks for recording on the first record track in reverse sequence the first recording reproduced from the first of said master record members and for recording on the second record track in reverse sequence the second recording reproduced from the second master record member, means including a first reel for winding up on said first reel said first record track as it passes said recording head so that the first record track is in order for the recording thereon to be played in proper sequence without rewinding, and means including a second reel for winding up said second record track on said second reel so that the second record track is in order for the recording thereon to be played in proper sequence without rewinding.

2. A recording apparatus as set forth in claim 1, further characterized by a plurality of wide record members one of which comprises a plurality of first magnetic record tracks integrally connected together side-by-side, said recording head means recording simultaneously on each of said plurality of first record tracks, and the other of which comprises a plurality of second magnetic record tracks integrally connected together side-by-side, said recording head means recording simultaneously on each of said plurality of second tracks, and means for splitting said wide record member into a plurality of relatively narrow record members each comprising one of said record tracks.

3. A recording apparatus for making copies of lengthy magnetic recordings on elongated magnetic record tracks comprising, in combination: a master record member having a recording thereon in a given sequence, a magnetic pickup head in flux linkage relationship with said master record member, master record driving means for driving said master record member, a record track, recording head means, driving means including reel means for driving said record track past and in flux linkage relationship with said recording head means and for winding said record track onto said reel, circuit means electrically connecting said pickup head to said recording head means, and control means connected to said master record driving means for selectively driving said master record in forward and reverse directions, said circuit means being complete when said master record member in moving past said pickup head in the reverse direction such that the recording thereon is reproduced in reverse sequence whereby said recording head means records the recording on the record track in reverse sequence and said recorded record track is wound onto said reel means in such sequence that the recording thereon can be played in forward sequence without rewinding said record track.

4. A recording apparatus as set forth in claim 3, further characterized by a wide record member comprising a plurality of record tracks integrally connected together side-by-side, said recording head means recording simultaneously on each of said plurality of record tracks, and means for splitting said wide record member into a plurality of relatively narrow record members each comprising one of said recorded record tracks.

5. The apparatus of claim 1 wherein a portion of the record track guide structure is movable to provide a rewind guide path different from the playback guide path.

6. The apparatus of claim 1 wherein a portion of each record track guide structure is movable to provide a rewind guide path different from the playback guide path, each movable portion being interconnected so that when one movable portion is in the rewind position the other is in the playback position.

7. The apparatus of claim 1 in which the record track guide structure defines a rewind guide path substantially identical with the play back guide path.

8. The apparatus according to claim 1 having means for impelling the record tracks independently.

9. The apparatus according to claim 1 having means for impelling the record tracks independently, and means for impelling the record tracks in opposite directions.

SEMI JOSEPH BEGUN.

REFERENCES CITED

The following references are of record in the file of this patent:

UNITED STATES PATENTS

| Number | Name | Date |
|---|---|---|
| 773,985 | Ries | Nov. 1, 1904 |
| 1,555,281 | Engl et al. | Sept. 29, 1925 |
| 1,811,817 | Stille | June 23, 1931 |
| 2,029,979 | Bernheim | Feb. 4, 1936 |
| 2,214,406 | Daniel | Sept. 10, 1940 |

FOREIGN PATENTS

| Number | Country | Date |
|---|---|---|
| 4,934 of 1926 | Australia | Aug. 2, 1927 |